United States Patent [19]

Carrier et al.

[11] 4,273,362
[45] Jun. 16, 1981

[54] INFORMATION-BEARING ARTICLE FOR CONVEYING INFORMATION WHICH CANNOT BE SURREPTITIOUSLY DETECTED

[75] Inventors: Lee A. Carrier, Longmeadow; Leon G. Carpenter, Wilbraham, both of Mass.

[73] Assignee: Ludlow Corporation, Needham Heights, Mass.

[21] Appl. No.: 898,658

[22] Filed: Apr. 21, 1978

Related U.S. Application Data

[62] Division of Ser. No. 685,646, May 12, 1976, Pat. No. 4,120,445.

[51] Int. Cl.$^3$ .............................................. B42D 15/00
[52] U.S. Cl. ........................................ 283/6; 283/8 B; 283/9 R; 229/83; 229/48 SA; 229/48 SB
[58] Field of Search ..................... 283/6, 8 R, 8 B, 11, 283/17, 7; 229/48 SA, 48 SB, 53, 62, 83; 427/7; 428/915, 916

[56] References Cited

U.S. PATENT DOCUMENTS

| 2,032,386 | 3/1936 | Wood | 229/83 X |
|---|---|---|---|
| 2,181,252 | 11/1939 | Vogel | 229/48 SA |
| 2,209,601 | 7/1940 | Heywood | 229/48 SA |
| 3,391,479 | 7/1968 | Buzzell et al. | 283/8 R X |
| 3,412,493 | 11/1968 | French | 283/8 R X |
| 3,566,521 | 3/1971 | Conner | 283/7 X |
| 3,655,494 | 4/1972 | Buzzell | 283/7 X |
| 3,732,119 | 5/1973 | Churchill et al. | 283/6 X |
| 3,827,625 | 8/1974 | Miller | 229/48 SB X |
| 3,895,755 | 7/1975 | McCarthy | 427/7 X |

FOREIGN PATENT DOCUMENTS

1382922 2/1975 United Kingdom ....................... 283/6

Primary Examiner—Paul A. Bell
Attorney, Agent, or Firm—Robert A. Cesari; John F. McKenna; Andrew F. Kehoe

[57] ABSTRACT

An information-bearing article for conveying indicia from one person to a second person in such a way that the information cannot be surreptitiously detected by an intervening person. Thus, the information-bearing means is so constructed that detection thereof necessarily requires some irreparable and detectable disfigurement or mutilation of the information-bearing article. Use of the article in lottery ticket distribution and use in connection with the transfer of highly confidential governmental or business information, are typical applications. The most advantageous construction of the invention combines means to avoid surreptitious detection of the hidden indicia by optical, chemical, thermal and mechanical processes.

10 Claims, 4 Drawing Figures

INFORMATION-BEARING ARTICLE FOR CONVEYING INFORMATION WHICH CANNOT BE SURREPTITIOUSLY DETECTED

This is a division of application Ser. No. 685,646 filed May 12, 1976, now U.S. Pat. No. 4,120,445.

BACKGROUND OF THE INVENTION

The invention relates to an information-bearing construction such as a letter, ticket, etc. wherein indicia must remain undetected for effective utilization thereof by the intended recipient. A lottery ticket may serve as a model for such information-bearing members, but it should be obvious that it represents but one of many applications for such a construction. For example, such articles have substantial utility in the mailing of credit cards, the transferral of such military information as code keys, the transferral of confidential business information and the like.

Another model would be a package, or pouch, for holding lottery tickets, credit cards, or like articles to be secured.

The problems associated with distribution of lottery tickets serve to illustrate the problems associated with the secret distribution of any readable information. Modern technology gives the unauthorized person a wide number of techniques with which he may attempt an unauthorized reading of information.

Among techniques that may be employed is the use of radiation including the use of X-rays, candling, fiber optics, lasers, infra red and microscopy or any combinations of these. Micro-surgical techniques, perhaps followed by regluing, are available. Other techniques include using chemicals or thermal effects to read the information. All of these techniques must be guarded against. The possible gains to a third party are high enough to justify a considerable investment in time and money to screen a construction for any vulnerability to detection using any of the foresaid methods. Absolute protection is desirable, but constructions which can be "solved" by techniques taking more than 10 to 15 minutes are also useful in some procedures wherein the information from a large number of articles is being screened rather than obtained for its intrinsic value.

Present techniques for protecting such information are weak. More scratch coatings are used over the indicia. In some applications, invisible magnetic recording is utilized. Other procedures known in the art include use of luminescent spot codes readable under ultra-violet light (U.S. Pat. No. 3,464,841); a procedure for destroying a personal photograph on a credit card if the card is tampered with (U.S. Pat. No. 3,679,449); and intermixing of chemicals to destroy an identification serial number on tampering with the card (U.S. Pat. No. 3,707,300). None of these techniques is directed to solving the problem to which applicants have directed their efforts.

SUMMARY OF THE INVENTION

Therefore, it is a principal object of the invention to provide a novel indicia-bearing construction which effectively prevents inspection of the indicia by a third party without the construction being so modified, as a result of the inspection, that evidence of tampering is manifest on subsequent inspection of the construction, thereby alerting the recipient that tampering has taken place.

It is a further object of the invention to provide such a construction which is relatively inexpensive, and is easy to open and inspect by its intended reader.

Another object of the invention is to provide such an article that can be surreptitiously screened by a properly equipped third party at a rate of not more than about four articles per hour.

It is a further object of the invention to provide an indicia-bearing construction wherein the application of chemicals thereto causes a visual change in the construction.

Another object of the invention is to provide means to protect the indicia against inspection by mechanical or microsurgical techniques by enclosing said construction in a novel pouch.

Further objects of the invention are to provide novel means to protect the indicia from exposure by mechanical delamination procedures or by thermal techniques.

An additional object of the invention is to provide a novel pouch means incorporating at least some of the protection means mentioned in the foregoing objects.

Another object of the invention is to provide a system whereby a ticket may be computer printed and assembled in a manner which continuously conceals indicia printed thereon.

Other objects of the invention will be obvious to those skilled in the art on reading this disclosure of the invention.

In the following description, the word "ticket" will sometimes be used to define the article of the invention. It is to manifest that the "ticket" could be a letter or memo containing military code key indicia or any other such article.

The above objects have been seen substantially achieved, to the extent they relate to a ticket-type aspect, by a laminated construction most advantageously comprising two independent layers which are laminated together, in register, to provide a secure ticket. It will be understood, however, that it is possible to utilize such layers independently, depending upon the degree of security desired. It should also be understoood that such sheet materials as described below can be incorporated in pouch constructions without any indicia, if it is desirable for any particular purpose.

In a typical ticket-type application, a first laminate is adapted to receive random computer-selected indicia and a control number thereupon before the indicia is hidden by lamination to the second sheet material over the indicia. It should be understood that often, it will be desirable to assure that the control number remains visible by selectively avoiding opaque coatings thereover. Other times, it may be desirable to hide the control number also. This of course depends upon the function of the number within any given security system.

This control number helps to assure further that a publicly-announced winning number cannot be counterfeited. The counterfeiter would have no way of knowing the corresponding control number, that information being within the ken of only a few officials who, presumably, hold it in trust. It will be understood that if such a control number is to remain visible, windows will be left in remaining layers to achieve this result.

The second sheet material comprises an adhesive which adheres to the computer printed surface, a transparent shield which is adhered to the printed surface by the adhesive, and a scratch coat over the shield.

The first laminate is carried on a substrate member, preferably paper, and comprises a radiation-blocking coating and a coat bearing a chemically-susceptible coloring agent. Also, the first laminate comprises a heat-responsive coating which will change its characteristics if heat is applied thereto.

It has been found that, in some embodiments of the invention, the adhesive attachment of two sheets provides a selective weakness whereby the two laminates may be detached from one another, thereby exposing the information one wishes to conceal. It is emphasized that such detachment is difficult and usually not practically achievable without (1) elaborate preparation by the person wishing to read the information and/or (2) some malfunction in the adhesion step.

Nevertheless, applicants have found that undetected and unauthorized delamination can be foiled by building a selectively-weakened interface into the first laminate. This interface is preferably between the base substrate and the imprinted code for which protection is sought. Such placement results in a preferential detachment of the base sheet from the coded portion of the ticket. Consequently, attempts to mechanically delaminate the ticket have two related results. First, delamination occurs at a point which will not reveal the code. As important, the manipulator is deprived of the relative mechanical stability of a substrate should be elect to continue his efforts to read the indicia.

In addition, the invention in its preferred form, incorporates heat-sensitive coatings and chemically-sensitive dyes each of which change their appearance when subjected to non-contemplated thermal and chemical attack, respectively.

The ticket construction described above is essentially foolproof: it is not believed information concealed within the construction can be obtained by any technique within any practical time period without leaving clear physical evidence of tampering. Notwithstanding this fact, it is sometimes desirable to further discourage attempts to tamper with the ticket by enclosing it in a novel envelope or pouch which further complicates any surreptitious attempt to discover the hidden indicia.

This pouch comprises a laminate comprising an internal coat of a cohesive, (that is an adhesive which sticks well to itself but has little or no adhesive characteristics with respect to most materials). This cohesive can advantageously be a cold-seal adhesive, usually formed of a rubber latex composition. The cold-seal adhesive is substantially opaque, but in some embodiments of the invention will comprise a window. The window, in a lottery ticket assembly, can serve to confirm that a ticket is in the pouch, show the control number, and also serve as a mechanical weakness in the pouch to facilitate non-surreptitious opening thereof. The cold-seal adhesive will usually be carried on a substrate, e.g., a paper substrate or glassine. The glassine or other substrate on which the cold-seal adhesive is coated can be advantageously printed or marked with inks comprising keyed coloring materials, e.g. dyes, that are activated to mark the pouch when chemicals which would attack the adhesive are used in the marking process. Indeed, the pouch may comprise any of the security means described in this application.

In some circumstances the pouch itself will contain the primary security means, that it will comprise radiation-blocking material, a thermal detector coat such as a blush coat, and dye means to expose tampering with solvents.

It should be clear from the above description that optimum security is achieved with an article which comprises a number of novel security-imparting features. Applicants wish to patent information-bearing articles which comprise any one of these features, because each contributes a substantial degree of security which is sufficient to satisfy the requirements of some users.

It should be realized that the drawing is a schematic one illustrative of a specific scheme. Those skilled in the art will, on reading this disclosure, understand that the dyes need not be printed on a substrate but, in most embodiments, could be as conveniently mixed into one or another of the other layers, e.g. the dyes would function substantially unimpaired, were they incorporated into the blush coating, release coating, base coating or even the pouch material. In general, it is preferred that they be close to the indicia to be secured.

Similarly, it should be realized that the various tampering-detecting features of the invention can be incorporated into a pouch-packaging means as well as directly into a ticket. Such a pouch has a wide variety of uses as a package means for articles which do not themselves contain any tampering-detecting means.

Thus, the pouch can comprise dyes and polymer coatings which are subject to chemical or thermal attack, radiation-blocking coatings, and the like.

ILLUSTRATIVE EXAMPLE OF THE INVENTION

In order to point out more fully the nature of the present invention, the following specific examples are given as illustrative embodiments of the present process and products produced thereby.

IN THE DRAWINGS

Figure 4:
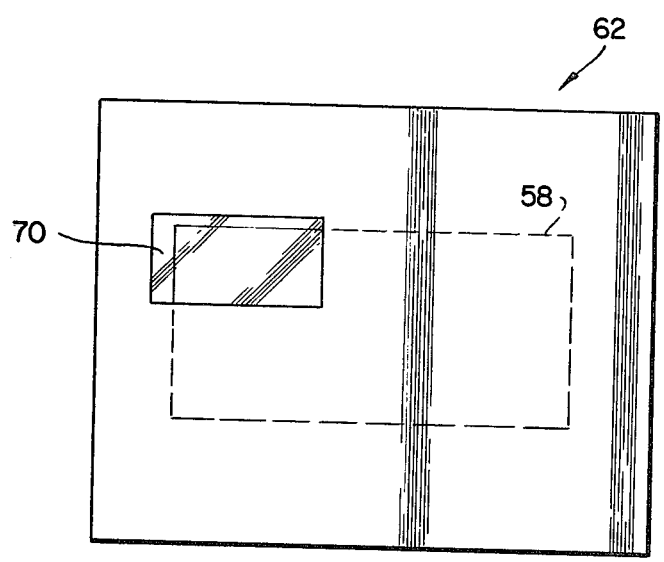

The pouch 62 of FIG. 4 is conveniently formed with a window section 70 in which specifying layer is omitted. Such a window aids in identifying positively the presence of a lottery ticket or other novelty item 58 therein.

Figure 1:
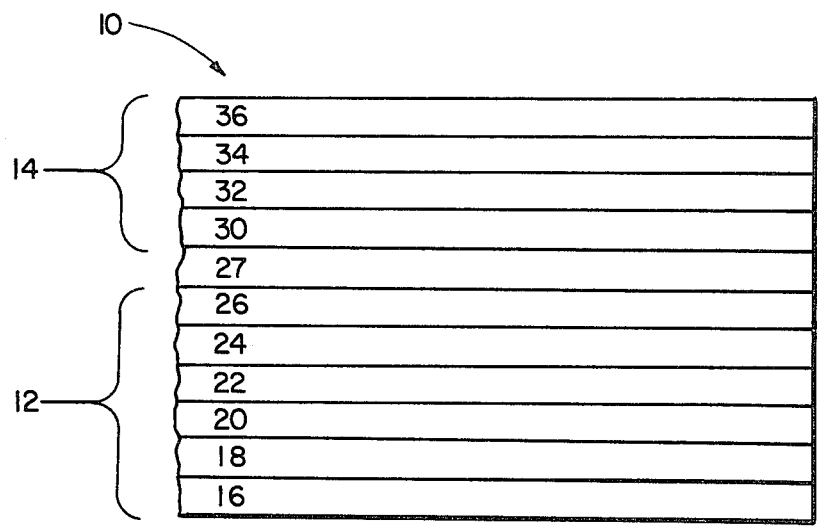
FIG. 1 illustrates, schematically, a fragmentary elevation of a lottery ticket formed according to the invention.

FIG. 1 illustrates schematically indicia-bearing assembly 10 prepared according to the invention. The assembly consists of two sheets: an indicia-bearing sheet 12 and a cover sheet 14.

Sheet 12 is formed of the following materials, listed in ascending order from the bottom of FIG. 1.

Paper Substrate 16:
  A paper sold by Hammermill as a "safety paper," any other 9 to 12 pt. board, or any other paper substrate.

Base Coat:
  Base 18, a resin coating or clay coating of the type generally called a "hold-out" coat in the paper coversion industry. Its function is to keep a subsequent coating from penetrating excessively into a porous substrate such as 16.

Base Coat 20:
  This release coating can be formed of any non-adherent material including suitable silicones, polymers of halogenated hydrocarbons, such as polytetrafluoroethylene or chrome complex resins or the like.

The important criteria is that the release be substantially easier than any other separation between two interfaces in assembly 10.

Opaque Coat 22:
This coating blocks radiation from scanning the ticket effectively. A typical formulation will include carbon black, DuPont Oil Red Powder, a metal powder such as aluminum powder or barium sulfate powder or the like, and a resinous binder.

Heat and Solvent Detector Coating 24:
This coating is a typical "blush" coating. On heating to above 150° F., depending upon the time of exposure to the heat, it will become relatively translucent. A dye is carried on or in the coating which will cause it to be colored on the application thereto of, at least, common aliphatic solvents.

Indicator 26:
This is another and optional dye, conveniently printed on the Detector coating. It is soluble is selected additional solvents.

Indicia 27:
This is merely the printing or other indicia which is to be hidden. Typically, a lottery ticket will be computer printed.

The above sheet 12 comprising a plurality of coatings is then laminated, in predetermined register, with a cover sheet 14, cover sheet 14 comprises in ascending order:

Adhesive 30:
This is preferably a thermosettable pressure sensitive adhesive, which also can have a solvent-suscpetible dye therewithin which will bleed defacing the sheet assembly on attack by a solvent.

Shield 32:
This overlays adhesive 30 and is usually formed of a tough, transparent polymer.

Removable Coat 34:
Scratch coatings are i.e. those that can be removed by a simple mechanical erasing action.

Print 36:
This can be any type of design. The ink should be adherent and resistant to simple chemical removal excepting that in some embodiments, it will be desirable to use an ink sensitive to some kind of solvent for the purpose of broadening the spectrum of chemicals against which the ticket is protected.

Figure 2:
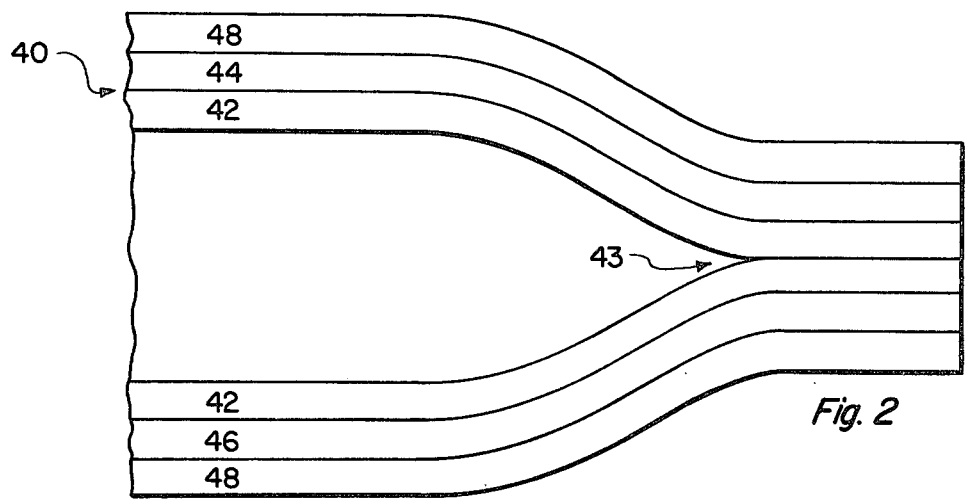
FIG. 2 illustrates, schematically, a fragmentary elevation of a pouch used in conjunction with the ticket of FIG. 1.

FIG. 2 relates to a novel pouch 40 comprising an opaque cohesive cold seal adhesive 42 which is self adherent as at 43. Adhesive 42 is carried on a thin substrate such as glassine or paper. In the illustrated embodiment, a dual-laminate pouch is used, the top of the pouch comprising a glassine substrate 44 and the bottom of the pouch comprising a paper substrate 46. In each case, a design 48 may be printed on the substrate.

The sheet 12 is advantageously formed by coating the paper substrate with a 5%-solid carboxy methyl cellulose (CMC) coating. A coating of 0.5 lbs per ream is adequate. Thereupon, a release coat 20 is overcoated upon the CMC. This release coat is formulated as follows:

| | |
|---|---|
| Water | 114 lbs. |
| Cellulose, thickening agent | 1.8 lbs. |
| Chrome-complex-type material sold under the trade name Quilon C by | |

| | |
|---|---|
| 3M company | 10.0 lbs. |

The chrome-complex-coating is buffered, as suggested by the manufacturer, with 1.2 lbs of a solution formed of 16.5 parts urea, 5.0 parts sodium formate, 0.2 parts of Formic acid, and 78.3 parts of water. The coating 20 is applied at about 0.3 lbs per ream.

After the release coat has been dried and cured as known in the art, opaque coat 22 is typically formed as follows:

| | |
|---|---|
| A dispersion of a furnace carbon black, 35% solids | 175 lbs. |
| Aluminum paste, 70% solids | 4 lbs. |
| thickening agents, 6% solids | 10 lbs. |
| Defoamer | 10 grams |
| | 218 lbs. |

This opaque, i.e. radiation-blocking, coating is applied at about 6 to 7 lbs. per ream. A "ream" in this application is taken as 500 20-inch by 24-inch sheets.

Coating 26 is utilized to provide a chemical change, e.g. a color change, if solvents are used to separate or otherwise tamper with the ticket. This coating is advantageously selected to complement the chemical character of the blush coating 24; that is, it will be selected to react to contact by chemicals to which the blush coating 24 will not react. Coating 26 can be placed above or below coating 24. A typical coating 26:

| | |
|---|---|
| Solution 1 | |
| Aliphatic-soluble, terpene type resin | 100 lbs. |
| Heptane | 75 lbs. |
| Oleic acid | 5.0 |
| Oil Red Powder as supplied commercially by DuPont | 1.5 |
| Solution 2 | |
| Water | 98 lbs |
| Triethanolamine | 5.0 lbs |
| Aqueous solution containing 10% ammonium caseinate | 50 |

Solution 1 and 2 are heated separately, to 140°-150° F. and then Solution 1 is added to Solution 2 using high speed, high-shear agitation to assure formation of an emulsion of the resin.

A polymeric pigment binder material is then added to the emulsion. A suitable material is that sold under the trade designation Geon 460X2 by B. F. Goodrich Chemical Co. This material is added in a quantity of about twice the weight of binder on a solid basis. The coating is then applied at 2.5 lbs per ream using, for example, a Meyer-Rod coating system.

Detector coating 24 is typically formed as described below. This illustrated coating reveals very short-term exposure of the ticket to temperatures of 180° F. or more, and reveals any more prolonged exposure of the ticket to temperatures in the 140°-150° F. range. Such heating is manifested by irreversible changes in the appearance of the coating. The typical formulation:

| | |
|---|---|
| An emulsion of polystyrene spherical beads sold under the trade designation Laticote | |

| -continued | |
| --- | --- |
| 7548A2 by Pierce & Stevens Co. | 287.0 lbs |
| A latex of the type sold under the trade designation UCAR 879 by | 77.0 lbs |
| A latex sold under the trade designation Acrysol GS (50%) | 18.0 lbs |

The resulting coating is coated upon coating 24 or 26 at a 5 to 6 lbs per ream coating weight.

The indicia which one wishes to conceal from undetectable access is advantageously printed on coating 22, although it may also be printed on coating 24. It is worth emphasizing that the printing is selected to the non-sensible by specialized techniques. It would be nonsense to go to the trouble of protecting the indicia, as has been done by applicant, and then proceed to use a detectable magnetic pigment to define the indicia unless one utilized a magnetic-shielding means appropriate to hide the indicia. This could be done by incorporating an effective quantity of magnetic pigment in e.g. layer 22.

It should be realized that the indicia may be printed on the top of the lower sheet 12 (as at 27) or the bottom of the cover sheet 14. Printing on sheet 12 is believed to be more advantageous; but, in general, the two techniques are equivalent.

As has been indicated elsewhere in this disclosure, cover sheet 14 is laminated to the above-described sheet 12.

A 50-lb base sheet sold under the trade designation Homer Polykraft Release by Ludlow Corporation is used as a transfer sheet. To this transfer sheet is added an acrylic adhesive, a pressure sensitive adhesive sold under the trade designation Hybond F9515 by Pierce & Stevens Co. The adhesive can be suitably applied at a coating weight of 7.5 lbs per ream. The transfer sheet is a 25-lbs-wt sheet of the type often used as a foil-carrier grade.

After all of the above work has been done, it is necessary to carry out printing and finishing operations. Such operations can include slitting and line-hole punching of the sheet 12. Printing of the indicia to be hidden may be carried out during the same pass through the press for line hole punching and in appropriate pre-determined registration with the line holes.

The transfer sheet comprising elements 32 and 30 can also be printed, e.g. with a control number that will relate to (or cross-reference) the hidden indicia. This transfer sheet can also be line-hole punched for registration with sheet 12. It will be obvious to those skilled in the web processing art that other processes for precision registration of two webs can also be utilized, e.g. optical sensing apparatus can be used.

The finished ticket is formed by the lamination, in register of sheet 12 and sheet 14 transferred from the transfer sheet. The transfer sheet itself, in this circumstance, forms no part of the resultant ticket. The lamination, of course, is such that the scratch coat 34 and shield 32 cover the hidden indicia.

A pouch is formed by lamination of two cohesive webs together, e.g. those formed by a cold-seal adhesive. By "cohesive" is meant an adhesive which has a strong tendency to adhere to itself preferentially at temperatures below 80° F. They are not usually tacky enough to form good adhesive bonds with most other materials such as wood, paper, glass or even most solid polymer surfaces. They are characterized by the difficulty of breaking the bond at ambient temperatures without substantial disruption of the sealing surface. Usually cohesives are formed by coating a polymer cold-seal adhesive on a substrate; natural rubber cold-seal adhesives are preferred.

A typical cohesive coating is formed as follows:

| | |
| --- | --- |
| Natural rubber latex such as that sold under the trade designation X2B by Firestone | 161 lbs. |
| Methyl Zimate, curing agt | 1.6 lbs. |
| Antioxidant | 0.4 lbs. |
| ZnO, curing agent | 1.6 lbs. |
| Carbon black | to opacify |

The resultant composition is coated completely over a (1) a paper substrate which will form the bottom of the pouch and (2) a major portion of a transparent, e.g. cellophane or polyester, film. In practice, the two cold-seal-coated webs will be brought into contact with one another along the perimeter of each ticket and sealed into a continuous roll, each roll containing a plurality of tickets, each encapsulated in the cold-sealed pouch. Tickets will best be separated by use of perforated liner the cold-sealed laminate between each ticket.

Figure 3:
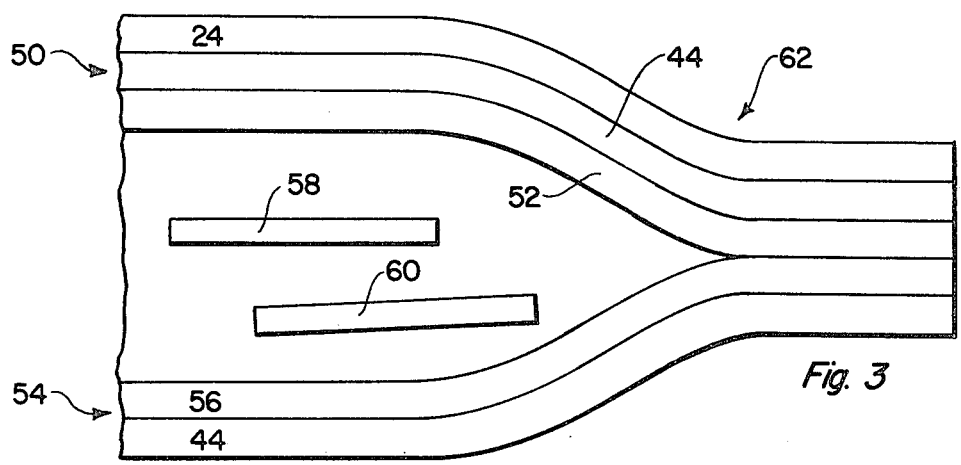
FIG. 3 illustrates, schematically, another pouch constructed according to the invention.

One particularly valuable embodiment of a secure pouch according to the present invention is illustrated in FIG. 3 and is constructed of two different webs. One web, 50 comprises a blush coat 24, a paper layer 44, and a cohesive coating 52 based on a cold-seal adhesive formulation. However, in this case of the cohesive coating 52, there is incorporated therein both a radiation-blocking material such as barium sulfate, and an oil-soluble dye such as Oil Red Powder (1.5% by weight). These additives are pre-dispersed and then mixed into the cohesive latex before being coated on paper layer 44.

Web 54 comprises a cohesive layer 56 similar to coating 52, except that it corporates any dye which is susceptible to attack by polar solvents as opposed to non-polar solvents. Below layer 56 is a paper sheet 44.

Of course, the various dyes and radiation-blocking items also could be coated and the paper substrates as separately-functioning coatings.

It should be emphasized that it is the common practice to take such constructions as are described in this application and apply a moisture-proof layer of transparent moisture-protective lacquer to either the finished items or to the outer surfaces of the different webs as they are manufactured.

Items 58 and 60 in the pouch 62 of FIG. 3 are novelty items which may be present as a single item or a plurality of items 60 and 58. The items could be lottery tickets as are described above or as are known elsewhere in the art. Also the items could be letters comprising proprietary information, lottery items of the type which, for example, might be required to match each other to establish a winning combination, or any like item.

It is to be understood that the following claims are intended to cover all of the generic and specific features of the invention herein described and all statements of the scope of the invention which might be said to fall therebetween.

What is claimed is:

1. An indicia-bearing article of the type wherein said indicia is not readily detectable except by irreversible alteration of the article, said article comprising (a) an indicia-bearing sheet, said sheet comprising (1) a substrate sheet forming a mechanically stable means for manipulating and handling said indicia-bearing sheet and (2) a release coating between said substrate sheet and an indicia-bearing surface of said indicia-bearing sheet;

(b) a cover sheet that is adhesively laminated to said indicia-bearing sheet and forms means to hide said indicia;

(c) said release coating forming means to cause preferential delamination of said article along a plane formed by said release coating before any delamination takes place at along said indicia-bearing surface.

2. An article as defined in claim 1 comprising, between said indicia-bearing surface and said release-coating, a dye and polymer-based coating so selected that, in combination, they form means to provide visual evidence of exposure to a broad range of aliphatic and aromatic solvents.

3. An article as defined in claim 2 wherein there is an opaque coating comprising a radiation-blocking filler between said substrate and said dye and said polymer-based coatings.

4. An article as defined in claim 1 wherein, between said indicia-bearing surface and said release coating, there is a polymer-based coating which, at temperatures of 150° F. or above, will change its physical appearance.

5. An article as defined in claim 4 wherein said polymer-based coating is formed of small thermoplastic particles deposited in intimate contact one with another within said indicia-bearing sheet and below said indicia.

6. An article bearing an indicia and of the type wherein said indicia is hidden by cover sheet and not readily detectable except by irreversible alteration of the article wherein there is in close proximity to said indicia, provided, upon a substrate therefor, (1) a coating of polymer material (2) at least one dye coated proximate said polymer material and wherein said dye and said coating are selected that the appearance of said indicia-bearing sheet will be altered by a broad range of organic solvents, (3) and a cover sheet for hiding said indicia and wherein (4) said polymer-based coating is formed of small thermoplastic polymeric particles deposited in intimate contact one with another within said indicia-bearing sheet, below said indicia, and wherein the appearance of said polymer-based coating is substantially changed by subjecting said polymeric particles to temperatures above 150 degrees F.

7. An article as defined in claim 6 wherein there is an opaque coating comprising a metallic filler between said substrate and said dye and said polymer-based coatings.

8. An article as defined in claim 6 wherein there is an opaque coating comprising a radiation-blocking filler between said substrate and said dye and said polymer-based coatings.

9. An article bearing an indicia and of the type wherein said indicia is hidden by a cover sheet and not readily detectable except by irreversible alteration of the article wherein there is in close proximity to said indicia, provided, upon a substrate therefor, (1) a coating of polymer material (2) at least one dye coated proximate said polymer material and wherein said dye and said coating are selected that the appearance of said indicia-bearing sheet will be altered by a broad range of organic solvents, (3) a cover sheet for hiding said indicia, and (4) wherein said article comprises additionally, on a plane between said substrate and said indicia a release coating forming a release interface which will part at a lower peel strength than the interface between said indicia and said cover sheet.

10. An article as defined in claim 9 wherein there is an opaque coating comprising a radiation-blocking filler between said substrate and said dye and said polymer-based coatings.

* * * * *